United States Patent [19]

Riederer et al.

[11] Patent Number: 4,607,115
[45] Date of Patent: Aug. 19, 1986

[54] METHOD FOR INCREASING THE MOLECULAR WEIGHT OF DIORGANOPOLYSILOXANES

[75] Inventors: Manfred Riederer; Hartmut Menzel, both of Burghausen; Martin Piehler, Mehring, all of Fed. Rep. of Germany

[73] Assignee: Wacker-Chemie GmbH, Munich, Fed. Rep. of Germany

[21] Appl. No.: 799,067

[22] Filed: Nov. 18, 1985

[30] Foreign Application Priority Data

Feb. 7, 1985 [DE] Fed. Rep. of Germany ....... 3504185

[51] Int. Cl.[4] ................................................ C07F 7/08
[52] U.S. Cl. .................................................. 556/462
[58] Field of Search ......................................... 556/462

[56] References Cited

U.S. PATENT DOCUMENTS

| 2,759,008 | 8/1956 | Dunham et al. | 556/462 |
| 2,883,366 | 4/1959 | Kantor et al. | 556/462 X |
| 3,398,117 | 8/1968 | Baronnier et al. | 556/462 X |
| 3,398,118 | 8/1968 | Baronnier et al. | 556/462 X |
| 4,008,261 | 2/1977 | Brown et al. | 556/462 |

Primary Examiner—Paul F. Shaver

[57] ABSTRACT

Diorganopolysiloxanes may be polymerized to increase their molecular weight by heating the siloxane in the presence of a quaternary phosphonium hydroxide, in which one of the substituents on the phosphorus atom of the phosphonium cation is a monovalent radical containing carbon, hydrogen and silicon atom(s) and possibly siloxane oxygen atoms(s) and the three remaining substituents on the phosphorus atom are the same or different hydrocarbon radicals that are free of aliphatic carbon-carbon multiple bonds.

7 Claims, No Drawings

METHOD FOR INCREASING THE MOLECULAR WEIGHT OF DIORGANOPOLYSILOXANES

The present invention relates to a method for increasing the molecular weight of organopolysiloxanes and more particularly to a method for polymerizing diorganopolysiloxanes to increase their molecular weight.

BACKGROUND OF THE INVENTION

It has been known that diorganopolysiloxanes can be polymerized in the presence of a quaternary phosphonium hydroxide catalyst to increase the molecular weight of the siloxanes. U.S. Pat. No. 4,008,261 to Brown et al., for example, describes a method for increasing the molecular weight of diorganopolysiloxanes by mixing a catalytic amount of quaternary phosphonium hydroxide with a relatively low molecular weight diorganopolysiloxane and heating the resultant mixture at a temperature of from 30° C. to about 130° C., while removing all the water that is present until the desired molecular weight is effected. The quaternary phosphonium hydroxide employed as a catalyst in the method described by Brown et al. is deactivated in the presence of moisture.

Therefore, it is an object of the present invention to provide a method for polymerizing diorganopolysiloxanes by heating the siloxanes in the presence of a quaternary phosphonium hydroxide which can be easily dispersed in the diorganopolysiloxane to be polymerized. Another object of the present invention is to provide a method for accelerating the polymerization of diorganopolysiloxanes. Still another object of the present invention is to provide a method for polymerizing diorganopolysiloxanes in the presence of a quaternary phosphonium hydroxide to form high viscosity siloxanes in which the quaternary phosphonium hydroxides are not deactivated by the presence of water formed during condensation before the high viscosity diorganopolysiloxanes are formed. Still another object of the present invention is to provide a method for polymerizing diorganopolysiloxanes in which the diorganopolysiloxanes thus obtained have less than 30 ppm (parts per million) by weight of Si-bonded hydroxyl groups, with the simultaneous use of an organosilicon compound which controls the chain-length. A further object of the present invention is to provide a method for polymerizing diorganopolysiloxanes in which the quaternary phosphonium hydroxide can be deactivated by heating to at least 135° C. after the desired molecular weight is achieved.

SUMMARY OF THE INVENTION

The foregoing objects and others which will become apparent from the following description are accomplished in accordance with this invention, generally speaking, by providing a method for polymerizing diorganopolysiloxanes which comprises heating a diorganopolysiloxane in the presence of a quaternary phosphonium hydroxide, in which one of the substituents on the phosphorus atom of the phosphonium cation is a monovalent radical consisting of carbon, hydrogen and silicon atom(s) and possibly siloxane oxygen atom(s) while the three remaining substituents on the phosphorus atom are the same or different hydrocarbon radicals free of aliphatic carbon-carbon multiple bonds.

DESCRIPTION OF THE INVENTION

Any diorganopolysiloxane that could have been used in previously known methods for increasing the molecular weight of diorganopolysiloxanes in the presence of quaternary phosphonium hydroxide can be used as the diorganopolysiloxanes in the method of this invention.

Examples of suitable organopolysiloxanes are those having the formulas

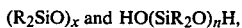
$(R_2SiO)_x$ and $HO(SiR_2O)_nH$, in which R represents the same or different monovalent hydrocarbon radicals, halogenated monovalent hydrocarbon radicals or monovalent aliphatic radicals which consist of carbon, hydrogen, ether oxygen and fluorine atoms, x is an integer having a value of from 3 to 8 and n is an integer having a value of at least 1, and preferably at least 2.

Preferably n has a value such that the average viscosity of the diorganopolysiloxane whose viscosity is to be increased does not exceed about 1000 $mm^2.s^{-1}$ at 25° C.

Preferably the radicals represented by R in the above formula contain from 1 to 18 carbon atoms per radical. Examples of hydrocarbon radicals represented by R include alkyl radicals such as methyl, ethyl, propyl, butyl, hexyl and octadecyl radicals; alkenyl radicals such as vinyl, allyl and hexenyl radicals; cycloaliphatic radicals such as cyclopentyl, cyclohexyl or cyclohexenyl radicals; aryl radicals such as the phenyl radical; aralkyl radicals such as the benzyl, beta-phenylethyl, beta-phenylpropyl radicals; alkaryl radicals such as the tolyl, xylyl and ethylphenyl radicals. Examples of halogenated hydrocarbon radicals represented by R include the 3,3,3-trifluoropropyl radical and o-, p- and m-chlorophenyl radicals. Examples of monovalent aliphatic radicals represented by R which consist of carbon, hydrogen, ether oxygen and fluorine atom(s) include the 1,1,2,2,3,3-hexafluoropropyloxypropyl and the 1,1,2,2-tetrafluoroethoxypropyl radicals. It is preferred that at least 80 percent of the organic radicals represented by R in the formulas illustrating the diorganopolysiloxanes used in the method of this invention are methyl radicals.

Only one type of diorganopolysiloxane can be used, or mixtures of at least two different types of diorganopolysiloxanes can be used in the method of this invention.

Preferably the diorganopolysiloxane having an Si-bonded hydroxyl group in each terminal unit whose molecular weight is to be increased in accordance with this invention have a viscosity of from about 100 to about 200 $mm^2.s^{-1}$ at 25° C. and more preferably 140 $mm^2.s^{-1}$ or approximately 140 $mm^2.s^{-1}$ at 25° C.

The preferred quaternary phosphonium hydroxides may be represented by the formula

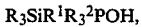
$R_3SiR^1R_3^2POH$, in which one of the substituents on the phosphorus atom of the phosphonium cation is a monovalent radical consisting of carbon, hydrogen and silicon atoms and possibly siloxane oxygen atom(s), while the remaining substituents on the phosphorus atom are the same or different hydrocarbon radicals free of aliphatic carbon-carbon multiple bonds.

In the above formula, R is the same as above, $R^1$ represents a divalent phosphorus-carbon bonded radical which is free of aliphatic carbon-carbon multiple bonds and which consists of carbon and hydrogen atom(s) and possibly silicon and oxygen atom(s). The radical represented by $R^2$ is the same or different and represents monovalent hydrocarbon radicals which are free of aliphatic carbon-carbon multiple bonds.

The examples cited for the radicals represented by R in the diorganopolysiloxanes are representative of the R radicals in the above formula representing the preferred quaternary phosphonium hydroxides. The tert-butyl radical is cited as an additional example of the R radical in the above formula representing the preferred phosphonium hydroxides.

Preferably, the radicals represented by $R^1$ consist of both carbon and hydrogen as well as silicon and siloxane oxygen atom(s). Especially preferred as the $R^1$ radicals are those having the formula $$-OSi(OSiR_3)_2(CH_2)_m-,$$

which R is the same as above and m is an integer having a value of from 1 to 8 and more preferably 3, for example, a radical having the formula $$-OSi[OSi(CH_3)_3]_2(CH_2)_3-.$$

Additional examples of preferred $R^1$ radicals are those having the formula $$-O(SiR_2O)_y[CH_{2-p}(CH_3)_p]_m-,$$

in which R and m are the same as above, p is 0 or 1 and y is an integer having a value of from 1 to 1000.

Examples of radicals having the formula $$R_3SiR^1-$$

those having the formula $$R_3Si[CH_{2-p}(CH_3)_p]_m-,$$

which R, m and p are the same as above. Specific examples of these radicals are those having the formulas $$(tert-C_4H_9(CH_3)_2Si(CH_2)_3-$$

and $$(CH_3)_3SiCH_3CHCH_3CH_2-.$$

The radicals represented by $R^2$ are the same monovalent hydrocarbon radicals devoid of aliphatic carbon-carbon multiple bonds which may be present in quaternary phosphonium hydroxides used in prior art methods for increasing the molecular weight of diorganopolysiloxanes. Preferably, the $R^2$ radicals contain at most 18 carbon atoms per radical. Examples of radicals represented by $R^2$ include alkyl radicals such as methyl, ethyl, n-propyl, isopropyl, n-butyl, sec-butyl, tert-butyl and 2-ethylhexyl as well as octadecyl radicals; cycloaliphatic hydrocarbon radicals such as the cyclopentyl and cyclohexyl radicals as well as the methylcyclohexyl radicals; aryl radicals such as the phenyl and naphthyl radicals; alkaryl radicals such as the tolyl radicals and aralkyl radicals such as the benzyl radical. The preferred $R^2$ radical is the n-butyl radical, because of its availability.

The preferred phosphonium hydroxide used in this invention can be prepared, for example, by the reaction of an organosilicon compound having the formula $$R_3SiR^1X,$$

with a phosphine of the formula $R_3{}^2P$, where R, $R^1$ and $R^2$ are the same as above and X represents chlorine, bromine or iodine. An example of a suitable organosilicon compound is an organopolysiloxane having the formula $$[(CH_3)_3SiO]_3Si(CH_2)_3Cl,$$

and an example of a suitable phosphine is tri-n-butylphosphine. The reaction of the organosilicon compound with the phosphine may be represented by the equation $$R_3SiR^1X + R_3{}^2P \rightarrow R_3SiR^1R_3{}^2PX.$$

The phosphonium halide thus obtained is then reacted with a basic compound, such as an alkali hydroxide, for example, sodium hydroxide, or a mixture of $Ag_2O$ and water. The reaction with the phosphine is preferably carried out in a solvent which is inert with respect to the initial reactants and the phosphonium halide. An example of a suitable solvent is dimethylformamide.

One type of quaternary phosphonium hydroxide can be used or mixtures of at least two different types of phosphonium hydroxides can be used in accordance with the method of this invention.

The quaternary phosphonium hydroxides used in accordance with this invention are readily soluble in the diorganopolysiloxanes, therefore, they can be added and mixed easily with siloxanes.

Preferably, the phosphonium hydroxides used in accordance with this invention are present in an amount of from 0.005 to 0.04 weight percent or 50 to 400 ppm (parts per million) by weight, based on the total weight of the diorganopolysiloxanes. The greater the amount of quaternary phosphonium hydroxide, the greater the rate of increase in molecular weight and the higher the molecular weight of the diorganopolysiloxanes.

Organosilicon compounds can also be used simultaneously in the method of this invention to control the chain-length of the diorganopolysiloxanes. Thus, any organosilicon compound which has been used heretofore or could have been used heretofore to control the chain-length can be used in this method for increasing the molecular weight of diorganopolysiloxanes. Examples of such organosilicon compounds which can be used to control the chain-length are, in particular, those having the formula $$R(SiR_2O)_zSiR_3,$$

in which R is the same as above and z is an integer having a value of from 1 to 50, as well as those having the formula $$(R_3Si)_2NH,$$

in which R is the same as above. Specific examples of such compounds pounds are trimethylsiloxy endblocked dimethylpolysiloxanes having a viscosity of 20 mPa.s at 25° C.; hexamethyldisiloxane; 1,3-divinyl-1,1,3,3-tetramethyldisiloxane and hexamethyldisilazane.

The amount of organosilicon compound employed to control the chain-length depends on the desired molecular weight. The greater the amount of organosilicon compound employed to control the chain-length, the lower the viscosity of the resultant diorganopolysiloxane.

Preferably, the organosilicon compound employed to control the chain-length is used simultaneously in the method of this invention.

The quaternary phosphonium hydroxide is preferably added to the diorganopolysiloxane whose molecular weight is to be increased, together with the organosilicon compound employed to control the chain-length, when desired, at room temperature and at least 1 hour prior to heating. Otherwise, no significant viscosity increase will be observed during about the first 10 minutes after the initial heating of the mixture containing the diorganopolysiloxane and the quaternary phosphonium hydroxide; thereby reducing the space-time yield. The quaternary phosphonium hydroxides used in accordance with this invention can be stored as solutions in, for example, trimethylsiloxy end-blocked dimethylpolysiloxanes which are liquid at room temperature.

The method of this invention is preferably conducted at a temperature of from about 100 to 130° C. and at atmospheric pressure, i.e., 1020 hPa (absolute) or at about 1020 hPa (absolute). It can also be conducted at higher or lower pressures, for example, from 0.1 to 500 hPa (absolute). In addition, the method of this invention can be carried out batchwise or continuously.

PREPARATION OF QUATERNARY PHOSPHONIUM HYDROXIDE

A solution containing 10 weight percent of quaternary phosphonium hydroxide is prepared in the following manner:

About 129 g (0.346 mol) of 3-chloropropyltris(trimethylsiloxy)silane and 71 g (0.351 mol) of tri-n-butylphosphine in 1060 milliliters dimethylformamide are heated to 110° C. for 24 hours with stirring in a 2-liter, three-necked flask equipped with a thermometer, stirrer and reflux condenser. The dimethylformamide is distilled off at $10^{-3}$ hPa (absolute). The residue is dissolved in 700 milliliters of water and mixed with 70 g of $Ag_2O$. After 24 hours, the resultant mixture is filtered, then the filtrate mixed with 1742 g of a trimethylsiloxy end-blocked dimethylpolysiloxane having a viscosity of 20 mPa.s at 25° C. and the water is distilled off from the resultant mixture at $10^{-3}$ hPa (absolute).

EXAMPLE 1

About 500 g of a dimethylpolysiloxane having an Si-bonded hydroxyl group in each terminal unit and a viscosity of 140 $mm^2.s^{-1}$ at 25° C. are mixed in a laboratory kneader having a 1-liter capacity with 55 g of a trimethylsiloxy end-blocked dimethylpolysiloxane having a viscosity of 20 $mm^2.s^{-1}$ at 25° C. and 0.2 g of the 10 weight percent solution of quaternary phosphonium hydroxide whose preparation is described above. This is then kneaded for 60 minutes at 1 hPa (absolute) at 110° C. About 8 weight percent of the fractions (based on the total weight of the organopolysiloxane added) which boil below 110° C. at 1 hPa (absolute) are trapped in a cold trap. The contents of the kneader are then heated to 180° C. and immediately cooled. The clear, colorless trimethylsiloxy end-blocked dimethylpolysiloxane thus obtained has a viscosity of 1087 $mm^2.s^{-1}$ at 25° C. It contains less than 30 ppm by weight of Si-bonded hydroxyl groups. After heating for 16 hours in air at 200° C., the viscosity change is only 1.6 percent measured at 25° C. and no turbidity is observed after 2 months of storage at room temperature.

EXAMPLE 2

The method described in Example 1 is repeated, except that 14.5 g of the trimethylsiloxy end-blocked dimethylpolysiloxane having a viscosity of 20 $mm^2.s^{-1}$ at 25° C. are substituted for the 55 g of organopolysiloxane.

The resultant clear, colorless trimethylsiloxy end-blocked dimethylpolysiloxane thus obtained has a viscosity of 112,000 $mm^2.s^{-1}$ at 25° C. It contains less than 30 ppm by weight of Si-bonded hydroxyl groups and after heating in air for 16 hours at 200° C., the viscosity change is only 2.6 percent, measured at 25° C. No turbidity is observed after 2 months storage at room temperature.

EXAMPLE 3

The method described in Example 1 is repeated, except that 10.4 g of a trimethylsiloxy end-blocked dimethylpolysiloxane having a viscosity of 20 mPa.s at 25° C. are substituted for the 55 g of organopolysiloxane.

The resultant clear, colorless trimethylsiloxy end-blocked dimethylpolysiloxane thus obtained has a viscosity of 532,000 $mm^2.s^{-1}$ at 25° C. It contains less than 30 ppm by weight of Si-bonded hydroxyl groups and after heating for 16 hours in air at 200° C., the viscosity change is only 3.2 percent, measured at 25° C. No turbidity is observed after 2 months of storage at room temperature.

EXAMPLE 4

The method described in Example 1 is repeated, except that the mixture of low molecular weight products described in Example 1 is prepared 16 hours before it is introduced into the kneader. A viscosity of about 1000 mPa.s at 25° C. is reached after about 10 minutes.

The properties of the resultant organopolysiloxane are identical to the properties of the organopolysiloxane prepared in Example 1.

EXAMPLE 5

About 100 liters/hour of a dimethylpolysiloxane having an Si-bonded hydroxyl group in each terminal unit and a viscosity of 140 $mm^2.s^{-1}$ at 25° C. and 40 g/hour of the 10 weight percent solution of quaternary phosphonium hydroxide, whose preparation is described above, are fed into a twin-screw kneader having a 140 cm reaction zone which is maintained at 130° C. and at 8 hPa (absolute). A dimethylpolysiloxane having a viscosity of 80,000 mPa.s at 25° C. and having an Si-bonded hydroxyl group in each terminal unit reaches the discharge tube via a discharge screw through a heat exchanger in which the organopolysiloxane is increased to 160° C.

The resultant organopolysiloxane is clear and colorless and after 12 months of storage at room temperature, no change in the viscosity or appearance of the organopolysiloxane is observed. The organopolysiloxane may be used in preparing organopolysiloxane elastomers.

What is claimed is:

1. A method for increasing the molecular weight of organosilicon compounds which comprises heating a mixture containing a diorganopolysiloxane and a quaternary phosphonium hydroxide in which one of the substituents on the phosphorus atom of the phosphonium cation is a monovalent radical containing carbon, hydrogen and silicon atoms, and the other three substituents on the phosphorus atom are hydrocarbon radicals which are free of aliphatic carbon-carbon multiple bonds.

2. The method of claim 1, wherein the monovalent radical contains carbon, hydrogen, silicon and siloxane oxygen atoms.

3. The method of claim 1, wherein the three hydrocarbon radicals on the phosphorus atom which are free of carbon-carbon multiple bonds are n-butyl radicals.

4. The method of claim 1, wherein the quaternary phosphonium hydroxide has the formula $[(CH_3)_3SiO]_3Si(CH_2)_3(n\text{-}C_4H_9)_3POH.$ 5. The method of claim 1, wherein the quaternary phosphonium hydroxide is present in an amount of from 0.005 to 0.04 weight percent based on the weight of the diorganopolysiloxane.

6. The method of claim 1, wherein the quaternary phosphonium hydroxide is mixed at room temperature at least 1 hour prior to heating with the diorganopolysiloxane whose molecular weight is to be increased.

7. The method of claim 6, wherein an organosilicon compound is added to the mixture to control the chain-length.

* * * * *